INVENTOR
JOSEPH S. KANAREK
BY
Eli Mullin
ATTORNEY

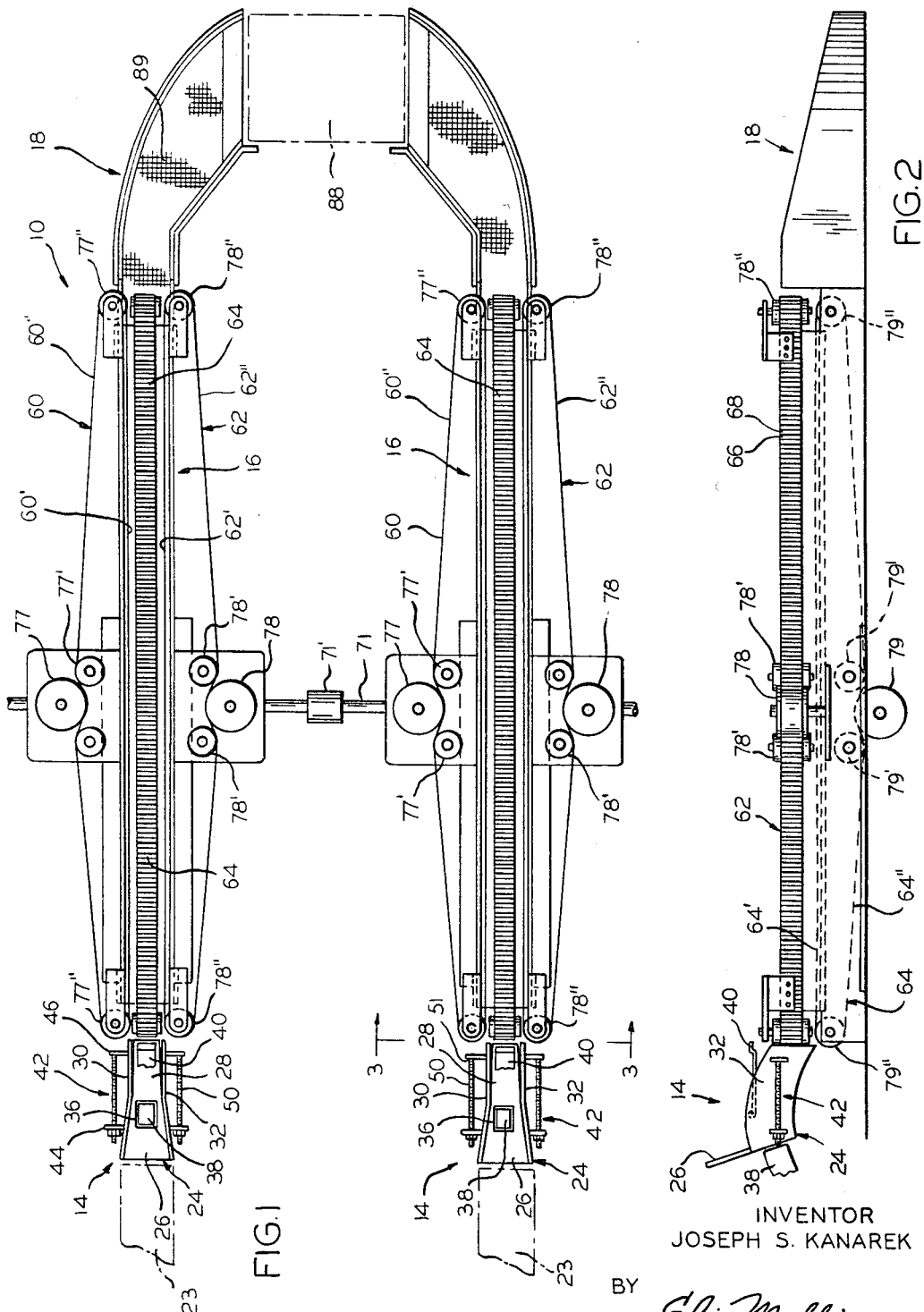

Aug. 6, 1968 J. S. KANAREK 3,395,784
AUTOMATIC DEVICE FOR COUNTING ARTICLES
AND DIVIDING THE SAME INTO GROUPS
Filed Oct. 12, 1966 4 Sheets-Sheet 3

INVENTOR
JOSEPH S. KANAREK

BY
*Eli Mullin*
ATTORNEY

Aug. 6, 1968   J. S. KANAREK   3,395,784
AUTOMATIC DEVICE FOR COUNTING ARTICLES
AND DIVIDING THE SAME INTO GROUPS
Filed Oct. 12, 1966                    4 Sheets-Sheet 4
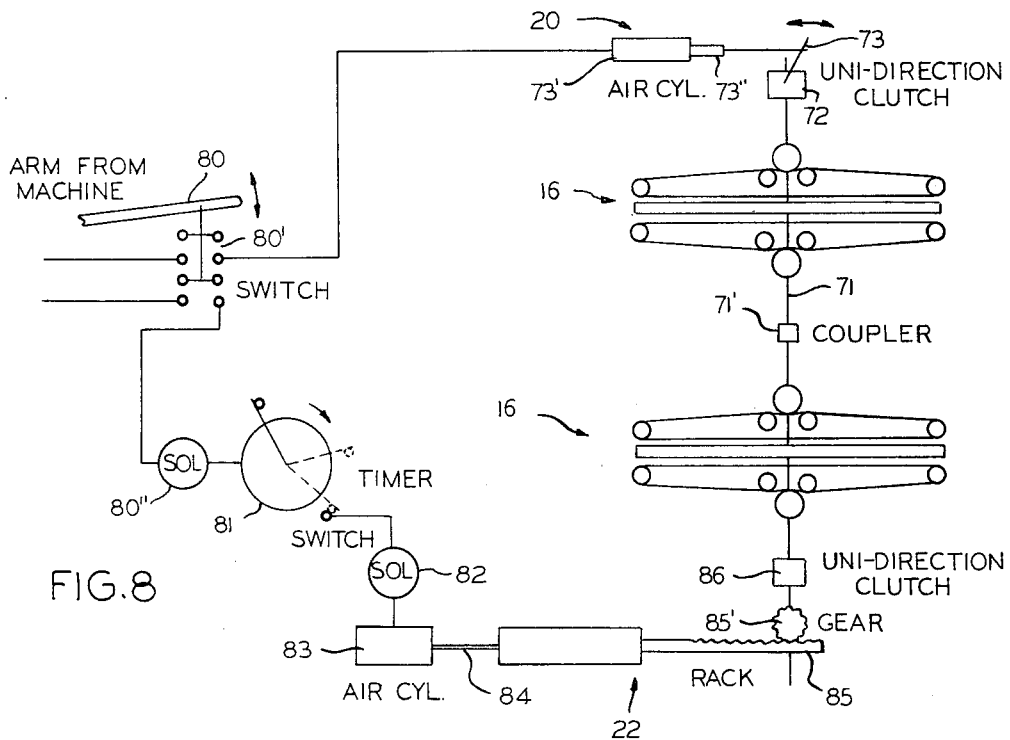
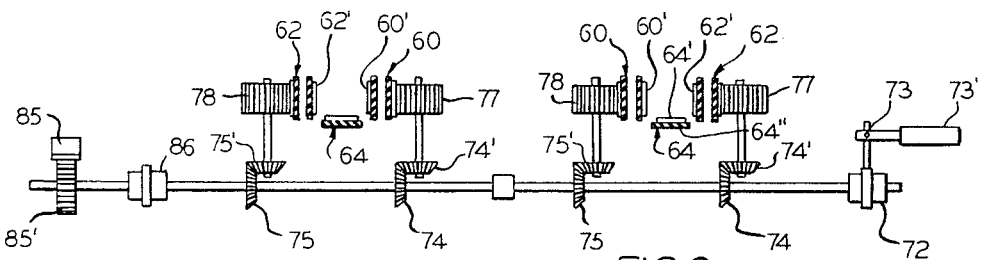
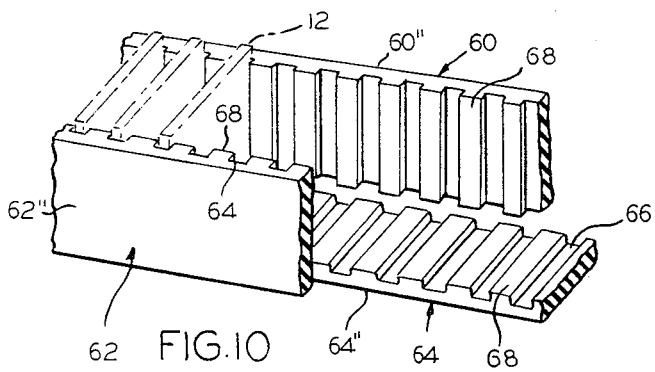
INVENTOR
JOSEPH S. KANAREK
BY
*Eli Mullin*
ATTORNEY

# United States Patent Office 3,395,784
Patented Aug. 6, 1968

3,395,784
AUTOMATIC DEVICE FOR COUNTING ARTICLES AND DIVIDING THE SAME INTO GROUPS
Joseph S. Kanarek, 5435 W. 63rd St.,
Chicago, Ill. 60638
Filed Oct. 12, 1966, Ser. No. 586,291
4 Claims. (Cl. 198—24)

ABSTRACT OF THE DISCLOSURE

An automatic article counting device has an input chute and output means, a conveyor receives articles from the input chute and delivers the same to said output means in predetermined increments of time, a first drive means is associated with the conveyor and moves the same so that the articles are received and conveyed equidistantly spaced in groups, and a second drive means advances the conveyor after the last article of each group a distance greater than the interval between the articles of the group.

---

This invention relates generally to an automatic device for counting articles and dividing the same into groups. More particularly, the invention relates to an automatic bag counting device for use in conjunction with machines which fill and seal small containers such as tea bags, sugar bags and the like.

Prior to the invention herein, sugar bags, tea bags and the like were filled, sealed and then deposited into an outlet bin. A predetermined number of the filled bags would be counted by an assembly line worker and either manually packed into a container or sent on a conveyor belt to an automatic packaging station. The invention herein overcomes the inefficiency and inaccuracy inherent in manual counting of the bags prior to the packaging of the same.

A primary object, therefore, of this invention is to provide an automatic device for counting tea bags, sugar bags and similar type articles, and dividing the same into groups comprising a predetermined number of said bags. A related object is to provide said device with means for readily adapting the same for use with bag filling machines.

Another object of the invention is to provide an automatic bag counting device which is adaptable for use with a bag filling machine and capable of being readily synchronized or adjusted in order to accept the bags at the same rate as the bags are fed out from the bag filling machine.

Still another object is to provide a bag counting device which accepts a bag during each time increment of a predetermined number of increments comprising an operating cycle of the device, to form a group of bags equal in number to said increments of the operating cycle. The device includes means for separating one group from the next group to be formed, thereby providing a predetermined time interval between groups.

Another object is to provide an automatic article counting device comprising a drive means operating at spaced apart time intervals to move the conveyor means of the device from the input means to the output means and enable the conveyor means to receive each article of a group of articles at substantially equal intervals of distance.

Yet another object is to provide an automatic article counting device having a drive means to move the conveyor means a predetermined distance without receiving articles from an input means of the device and without interrupting the rate of input of the articles to said input means.

A primary feature of the invention is to provide an input chute having resilient side walls whereby the same may be adjusted inwardly and outwardly by applying an abutting force against a bracket member rigidly attached to the outside surface and adjacent the free outer ends thereof.

Another feature is to provide a cogged or toothed type conveyor belt for a conveyor system whereby the spacing between two adjacent cogs serve to cooperate with the drive means of the conveyor belt to advance the same and also function to provide a retaining means for a bag when conveying the same between an input and output means of the conveyor system.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

FIG. 1 is a plan view of two automatic counting devices feeding into a single output bin and embodying the principles of the invention;

FIG. 2 is a side elevational view of either of the automatic counting devices in FIG. 1;

FIG. 8 is a schematic diagram showing the interrelationship between the control means, the drive means and the conveyor means of the counting device;

FIG. 9 is a side view of the main drive shaft and showing the mechanical drive system of the device for controlling the movement of the conveyor means; and FIG. 10 is a fragmentary enlarged section of the three cogged conveyor belts comprising the conveyor means for one of the counting devices shown in FIG. 1.

Figure 3:
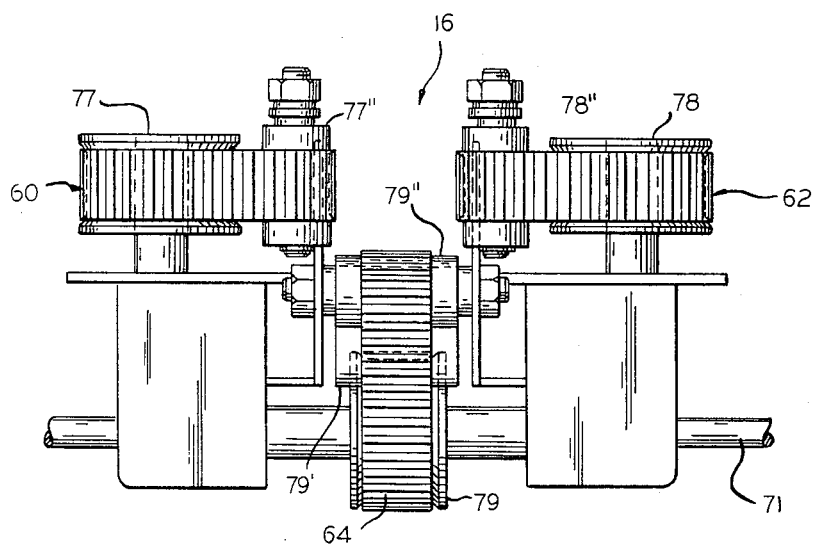
FIG. 3 is a front end view taken on the plane of the line 3—3 in FIG. 1, viewed in the direction indicated, and showing the three conveyor belts and the support structure for the same of one of the automatic counting devices.

Referring now to the several figures of the drawings, the reference numeral 10 (FIGS. 1 and 2) indicates generally an automatic device embodying the principles of the invention for counting articles such as bags or the like 12 and separating the same into groups comprising a predetermined number of bags. The device 10 comprises an input means indicated generally by the reference numeral 14, a conveyor means indicated generally by the reference numeral 16 and an output means indicated generally by the reference numeral 18. A main drive means indicated generally by the reference numeral 20 (FIGS. 8 and 9) is associated with the conveyor means 16 to drive the same at equally spaced time intervals between the input means 14 and the output means 18. A second drive means 22 (FIGS. 8 and 9) is activated after the last bag 12 of a group is received on the conveyor means 16. Drive means 22 advances the conveyor means a predetermined distance to separate one group from the next group to be formed. The main drive means 20 and the second drive means 22 may simultaneously drive the conveyor means for several automatic counting devices 10. In the illustrated embodiment two devices 10 are being driven.

General operation

The bags 12 which are to be automatically counted by device 10 and separated into groups are fed individually into the input means 14 from a supply source 23 shown in phantom in FIG. 1. Such source, for example, may comprise a bag filling and sealing machine which discharges a bag at predetermined equal increments of time. Thus, the input means 14 is connected to said machine to receive the discharged bags.

Input means 14 feeds each bag received from the supply source 23 to the conveyor means 16 during each of said increments of time.

The conveyor means 16 driven by the main drive means 20 receives each bag 16 of a group at substantially equal intervals of distance. After the last bag of the group is received on the conveyor means 16, but before the first bag of the next subsequently formed group is received by the conveyor means 16, the second drive means 22 is activated and advances the conveyor means 16 a predetermined distance which is substantially greater than the interval distances between the bags of each group on the conveyor means 16. Thus, the group of bags is separated from the next group to be formed. However, to provide this predetermined group separating distance without interrupting the feed rate of the bags 12 from source 23 and maintaining accuracies of the number of bags in each group, the conveyor means 16 is driven through the predetermined distance within a time less than said increment of time between each deposit of a bag from the source into the input means 14.

Each bag of a group is fed from the conveyor means 11 into the output means 18. The predetermined distance between groups of bags provides a time interval to permit removal of each group from the output means 18 prior to receiving any bags belonging to the next subsequently formed group.

Input means

Figure 5:
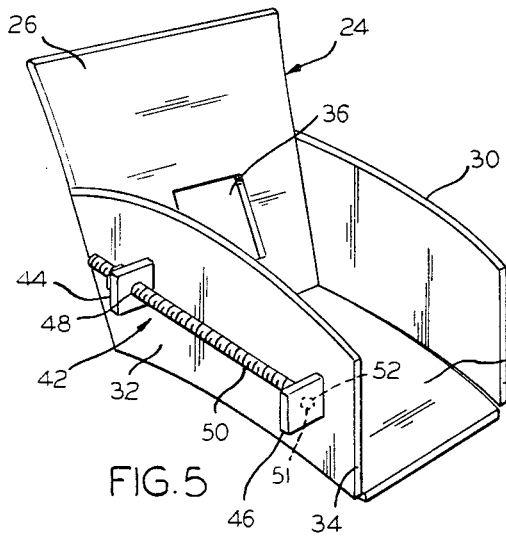
FIG. 5 is an elevational perspective view of the input chute of the counting device.
Figure 6:
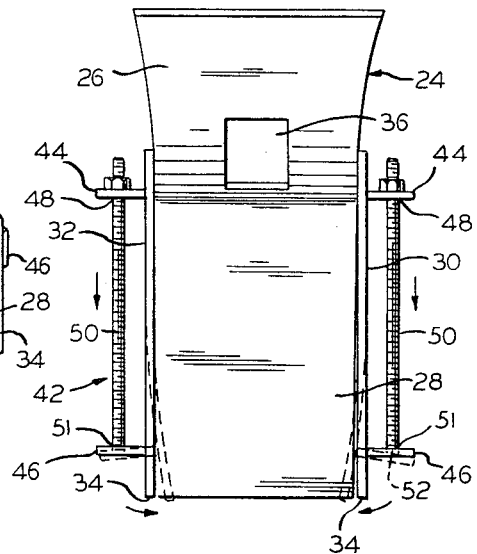
FIG. 6 is a top view of the input chute and showing in phantom the variation of position of the side walls when adjusting the same.
Figure 7:
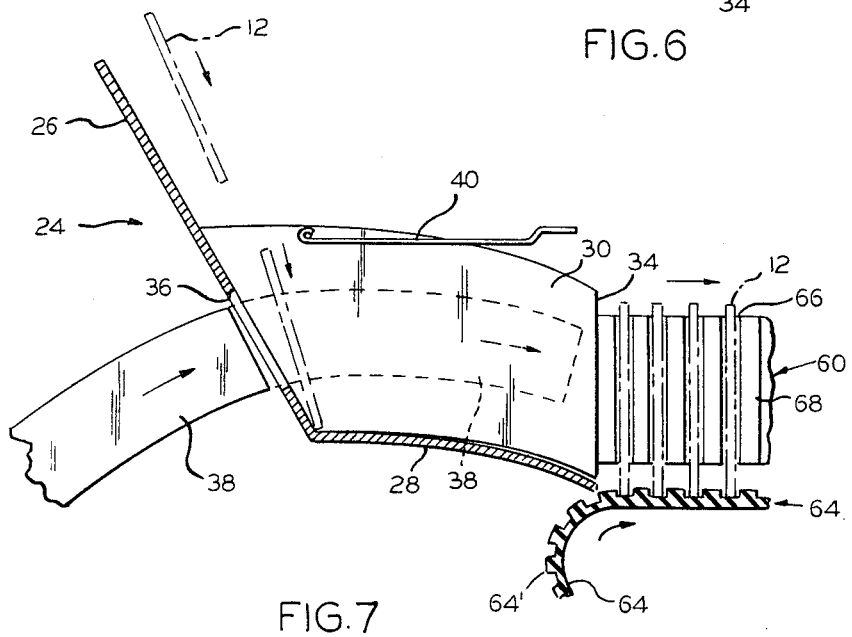
FIG. 7 is a side view of the input chute and the adjacent portion of the conveyor means, and showing the direction of movement of the pusher member when depositing a bag onto the conveyor means.

Turning now to FIGS. 1, 2, 5, 6 and 7, input means 14 will be described. As shown, input means 14 comprises an input chute 24 having a rear inclined wall 26, a bottom wall 28 and a pair of opposed side walls 30, 32. The walls may be formed into shape from a single sheet of resilient material. The inclined shape of rear wall 26 provides a sliding surface for bags 12 as the same are discharged from the bag source into the input means. Moreover, since the bags are fed into chute 24 on an angle as shown in FIG. 7, the bags tend to flop backwards and find support against the rear wall 26. Side walls 30, 32 are only attached to opposed sides of the rear wall 26 to permit the distance between the outer end area 34 of the side walls to be readily adjusted, as will be more fully described as the description of the input means proceeds.

The rear wall 26 is formed with an opening 36. A pusher member 38 lies adjacent opening 36 on the outside surface of the rear wall 26. In the usual operation of device 10, the pusher member 38 is controlled by the feed source machine 23 and operates at equally spaced increments of time which are synchronized with the output feed of the source machine 23. During each increment of time comprising the operating cycle of device 10 for forming the group of bags 12, the pusher member moves through opening 36 and forces the bag lying against rear wall 26 to move toward the conveyor means 16 until it is finally received thereon. After the bag is placed on the conveyor belt the pusher member returns to its normal position on the outside of the rear wall 26. A hold down plate 40 spaced from rear wall 26 is positioned over the top of chute 24 to prevent the bags from flying out of the input means when contacting the pusher member 38. The plate 40 may be pivotally associated with the side walls 30, 32 or otherwise suitably connected.

An adjustment means indicated generally by the reference numeral 42 is associated with each of the side walls 30, 32 of input chute 24 (see FIGS. 1, 5 and 6). Adjustment means 42 comprises a pair of laterally spaced apart right angled brackets 44, 46 rigidly attached to side walls 30, 32. Bracket 30 is positioned adjacent rear wall 26 whereas bracket 32 is positioned at the end areas 34 of the side walls 30, 32. The outward extending portion of the right angled brackets 44 includes a threaded opening 45 to threadedly accommodate therethrough an elongated screw member 50. The outer end 51 of screw members 50 operationally abut against the second bracket 44. A recess 52 (FIG. 5) may be provided inside bracket 46 to prevent slippage of the screw outer end 51. Thus, when screw member 50 is rotated in the direction of increasing abutting force against the second bracket 46, the outer end area 34 of the corresponding side wall 30 or 32 bends inwardly toward the opposite side wall.

Conversely when screw member 50 is rotated in the direction of decreasing abutting force against the second side bracket 46, the outer end area 34 of the corresponding side wall 30 or 32 bends outwardly away from the opposite side wall and resiliently return toward its normal position. Thus, the width of the chute 24 is readily adjusted, thereby insuring that the bag is received at the desired place on the conveyor means 16.

Conveyor means

Referring now to FIGS. 1, 2, 3, 4, and 7 to 10, the conveyor means 16 will be described. The conveyor means 18 for each counting device 10 comprises a pair of oppositely and spaced apart continuous side belts 60 and 62 and a bottom continuous conveyor belt 64 disposed between side belts 60 and 62. Each belt 60, 62 and 64 is of a cogged or toothed construction on the outer side thereof (see FIGS. 4 and 7). Thus, a spacing 66 is formed between two adjacent cogs 68 throughout the continuous length of each belt 60, 62, 64.

Each belt 60, 62, 64 includes a conveying portion 60', 62' and 64' which functions to convey the articles from the input means 14 to the output means 18, and a drive portion 60'', 62'' and 64'' which serves to cooperate with the main drive means 20 or the second drive means 22 to advance the respective conveyor belts. The cogs 68 and spacing 66 therebetween when forming a part of the drive portions 60'', 62'' and 64'' serve to engage a gear means or sprocket 72 (FIGS. 1, 2 and 4) associated with the corresponding conveyor belts to cause the same to advance. However, the same cogs 68 and spacing 66 therebetween, function as a retaining means for a bag when the same is conveyed between the input means 14 and output means 18.

Figure 4:
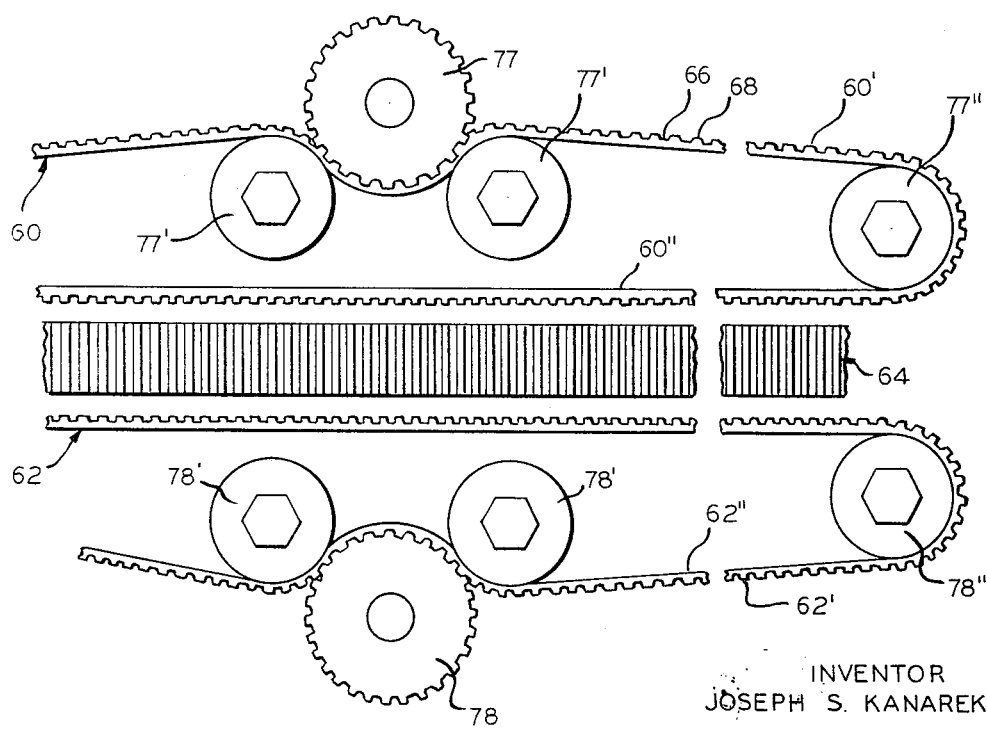
FIG. 4 is an enlarged fragmentary top plan view of the conveyor means of the counting device.

With regard to the conveying function of the cogs 68 and the spacing 66 therebetween, each belt 60, 62, 64 is synchronized whereby the cogs of the conveying portion of side belts are always oppositely disposed and the cogs of the bottom belt is always positioned between opposed cogs of the side belts. In this manner, the opposed spacings 66 of the side belts 60, 62 and the spacing 68 of bottom belt 52 provide an accommodating area to receive an article from the input means (FIGS. 4 and 7). The cogs 68 of the belts adjacent these aligned spacings 66 in the moving direction of the belt prevent the bag 12 from falling flat on the bottom conveyor belt 64. As soon as the cogs 68 adjacent these spacings 66 but on the opposite sides thereof, move to the back side of the bag, the bag is securely positioned in the slot thus formed, by the cooperation of a pair of cogs from each of the three cogged belts 60, 62 and 64 as best seen in FIG. 7. Thus, the bags in their individual slots move in a substantially upright position between the input means 14 and output means 18 of device 10.

*Conveyor drive means*

Referring particularly to FIGS. 8 and 9 the main drive means 20 and the second drive means 22 will be described. The main drive means 20 of device 10 comprises a main drive shaft 71 (FIG. 9). Shaft 71 may also function as a main drive shaft for a bag feeding source 23 connected to the input means 14. Thus, if this were the case, precise synchronization between the feed source 23 and the counting device 10 may be achieved.

A uni-directional clutch mechanism 72 is attached to shaft 71 and to a pulsed driving source 73. The clutch mechanism 72 is adapted to provide indexed or intermittent rotational movement of the main shaft 71.

The pulse driving source 73 may be controlled by an electro-mechanical triggering means which opens and closes an electrical circuit at predetermined increments of time. This drives a mechanical driving means which causes the shaft 71 to rotate an arcuate distance as determined by the indexing of the clutch mechanism 72. Such mechanical driving means may be an air cylinder 73' which ejects a plunger 73" during each increment of time, thereby forcing the rotation of shaft 71. Such movement of the main drive shaft 71 causes the meshed beveled gears 74, 75 associated with side belts 60, 62 (FIG. 9) to rotate and also the beveled gears associated with bottom belt 64 to rotate (not shown). This, in turn, causes the sprockets 77, 78 and 79 to move respectively the two side belts and bottom belts comprising the conveying means of the device (see FIG. 4). After each movement of the conveyor means by the first drive means 20, the pusher 38 deposits another bag in the conveyor means. Since the gear ratios are pre-set the same for each belt, the movement for each belt 60, 62 and 64 of conveyor means 18 would be the same.

The electro-chemical triggering means may comprise an oscillating arm 80 which opens and closes a switch 80'. The opening and closing of switch 80' impresses and removes driving electrical power from solenoid 80". Solenoid 80" drives the air cylinder 73'.

Each pulse triggering the main drive means 20 is fed into a counter or timer 81 which records the number of pulses fed during a given time. Each recorded pulse represents a bag received by the conveyor means 16. After a predetermined number of bags have been received on the conveyor means, the same number of pulses have been recorded by the counter 81. Of course, mechanical means may alternatively be employed to trigger the counter or timer 81 after each stroke of the air cylinder rather than electrical pulses. After said predetermined number of bags have been received on the conveyor belt, the counter 81 closes a switch 81' which energizes solenoid valve 82. This activates the second drive means 22 to rapidly advance the conveyor means 16, to provide a predetermined distance between one group of bags and the next successive group of bags to be formed.

The second drive means 22 comprises an air cylinder 83 driving a plunger 84. The outer end of the plunger 84 is attached to a rack 85 which engages a gear 85' associated with a clutch 86. Clutch 86 is indexed to provide substantially greater arcuate movement of the main drive shaft 71 than is possible from the indexing of clutch 72. The movement of the main shaft 71, due to the force of plunger 84 driving rack 85, is transmitted to beveled gears 74 and 75 of the sides belts 60, 62 of the devices 10 and to the bottom belt 64 (not shown) which in turn cause the corresponding conveyor belts to move a predetermined distance. This predetermined distance is substantially greater than the interval distance between the individual bags of each group.

The interval of time to move the conveyor belts the predetermined distance is preferably set less than the increment of time between the successive feeding of the individual bags into the input means 14 for deposit on the conveyor means 16. Thus, each group of bags 12 comprising a predetermined number of bags is spaced apart on the conveyor means 16 without interrupting the feed rate of the bags 12 into the input means 14. This is accomplished as aforedescribed by the rapid advance feature of the second drive means 22.

A pair of spaced apart idler rollers 77' are positioned adjacent sprocket 77 which advances side belt 60 (FIG. 4). Similarly, a pair of spaced apart idler rollers 78' are positioned adjacent sprocket 78 which advances side belt 62 (FIG. 4). Finally a pair of idler rollers 79' are positioned adjacent sprocket 79 which advances bottom belt 64. These idler rollers insure positive meshing engagement between the sprocket and the corresponding belt.

Continuous belt 60 revolves around a pair of oppositely positioned end rollers 77", continuous belt 62 revolves around a pair of oppositely positioned end rollers 78" and finally continuous belt 64 revolves around oppositely positioned end rollers 79". These end rollers may be mounted on device 10 in any suitable manner.

*Output means*

The output means 14 comprises an output chute 87 which receives the bags from the conveyor means and deposits same in an output bin 88. Since, as shown in FIG. 1, two conveyor means 16 are simultaneously in operation, the bin 88 therefore simultaneously receives two groups of bags one from each device 10. The bin 88 may receive the bags from each group either one at a time or a substantial number of a group may be deposited in the bin 88 during the short time interval when the conveyor means is rapidly driven the predetermined distance for spacing a group of bags from the next group of bags to be formed. Thus, once a group of bags comprising a known number of the bags is deposited into the bin 88, the same must be removed from the conveyor belt within a time interval determined by the predetermined distance separating one group from the next group on the conveyor means 16 and the rate of movement of the conveyor means 16 during each increment of the operating cycle of device 10.

The output chute 87 is formed with apertures 89 substantially smaller than the bags 12 received thereon but of sufficient size to permit passage of dirt and debris therethrough. Although any suitable means to accomplish this may be employed, I have found that forming the output chute 76 from Teflon netting provides an adequate sliding surface for the bags and at the same time functions to filter out dirt and debris.

*Summary*

The counting device 10 affords means to automatically count articles by forming same into groups comprising a predetermined number of such articles. In the described embodiment, articles 12 are continuously fed from a feed source 23 at a particular feed rate normally determined by the feed source 23.

Articles 12 are fed into the input chute 24 of the input means 14 per each increment of a predetermined number of increments forming the pre-set operating cycle of device 10. During each of said increments, the article 12 is moved on the conveyor means by a pusher member 38 which moves in and out of the chute 24 through opening 36 within the inclined rear wall 36. The pusher member 38 may be part of device 10, but it also could form a part of the feed source machine 23 and adapted for use with device 10.

A main drive means 22 advances the belt the same distance during each increment of time. Thus, each article 12 comprising a group is equally spaced apart on the conveyor means 16. After the last article 12 of the group is fed onto the conveyor means, the second drive means 22 is automatically triggered by the counter 81. Drive means 22 rapidly advances the conveyor means 16 a predetermined distance which is substantially greater than the interval distance between the articles of the group. If it is desired to provide precise accuracy of the number of articles in each group, the time for rapidly advancing the conveyor means 16 by drive means 22 should be set substantially less than the increment of time between the feeding of one article 12 and the next article 12 into the input chute 24, to avoid any possibility of feeding a straggler in the predetermined distances on the conveyor means 16 separating the groups. Thus, by providing a time delay caused by the distance between the feeding of one group and the next into the output means 18, the known number of articles of the group in the output means 18 is removed from the receiving bin 88 before any of the articles from the next group are received.

Moreover, the input means is provided with adjustment means for controlling the distance between the side walls 30, 32 of the input chute 24. This adjustment insures the proper placement of the bags or articles 12 on the conveyor means 18 without the same being torn or ruined upon contact with the cogs 68 of the belts 60, 62 and 64.

Furthermore, by providing a cogged belt for the conveyor means 16, the individual teeth or cogs 68 serve a dual function. The cogs 68 and spacing 66 therebetween mesh with the corresponding sprocket 77, 78 or 79 associated with the drive of the corresponding belt 60, 62 or 64. Also, the same cogs 68 cooperating with a pair of cogs from each of the other belts, provide a retaining slot for the article when the same is carried from the input means 14 to the output means 18.

From the foregoing description and drawings, it should be apparent that I have provided a novel automatic device for counting articles and dividing the same into groups, of a greatly simplified and improved construction which accomplishes the aforestated objects and features in a remarkably unexpected fashion.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. An automatic article counting device comprising:
an input means for receiving one of said articles during each predetermined increment of time of a predetermined number of increments comprising each operating cycle of the device;
an output means to receive said articles;
a conveyor means disposed between the input and output means, said conveyor means receiving one of said articles from the input means during substantially each one of said increments for conveying same to the output means;
a first drive means associated with the conveyor means and moving the same between the input and output means, said first drive means enabling said conveyor means to receive each article at substantially equal intervals of distance, the number of articles received during the operating cycle comprising a group of articles;
a second drive means associated with said conveyor means and operative after the last article of one of said groups is received by said conveyor means, said second drive means advancing the conveyor means a predetermined distance substantially greater than the spaced intervals of distance between the articles, thereby separating said group of articles on the conveyor means from the next group of articles to be formed without interrupting the feeding of the articles into the input means;
said input means comprising an input chute having an inclined rear wall providing a sliding surface for the article, a bottom wall and a pair of opposed side walls disposed on opposite sides of the rear wall and extending toward the conveyor means;
means to vary the distance between the outer ends of the side walls to provide control of the placement of the article on the conveyor means;
wherein the side walls are constructed of resilient material and the means to vary the distance between the outer end areas of the side walls comprises:
a first bracket spaced from a second bracket extending outward from at least one of the side walls, each of the first brackets having a threaded opening therein;
a screw member threadedly accommodated within the threaded openings within the first bracket, the outer ends of each screw member operationally abutting against the second bracket, the rotation of the screw member in the direction of increasing abutting force against the second bracket causing the outer end of the corresponding side wall to bend inwardly toward the opposite side wall, the rotation of the screw member in the direction of decreasing abutting force against the second bracket causing the corresponding side wall to resiliently move away from the opposite side wall.

2. The automatic article counting device of claim 1, wherein:
said first drive means applies a driving force to advance the belt a predetermined interval of distance during each of the increments of the operating cycle;
a counter triggered during each increment of the operating cycle to record the number of articles received on the conveyor means;
a coupling means associating the counter with the second drive means, said counter triggering the operation of the second drive means after recording the last increment of the operating cycle, the operation of said second drive means causing the conveying portions of the belt to move said predetermined distance prior to the commencement of the next successive operating cycle.

3. The automatic counting device of claim 2, wherein:
said output means comprises an apertured chute; and
an article collecting bin disposed at the output of the chute to collect the articles, the apertures formed in the output chute being substantially smaller than the articles but of sufficient size to permit passage of dirt and debris before the same is deposited with the articles into said bin;
said rear wall of the input chute includes an opening therein;
a pusher member pivotally associated with the rear wall, said pusher member positioned on the outside of the rear wall adjacent said opening thereof when in a non-operative position, said pusher member moving through the opening and forcing the article positioned within the chute on the conveyor means; and
a cap is associated with the rear wall of the input chute and extending therefrom to lie spaced above the bottom wall of the chute, said cap preventing ejectment of the articles out from the top of the chute when the pusher contacts the article for forcing the same on the conveyor means.

4. In a conveyor means comprising; an input means, an output means, a conveyor means disposed between the input means and the output means, and a drive means associated with the conveyor means and moving the same between the input and output means, said input means comprises:
- an input chute comprising an inclined rear wall providing a sliding surface for the article, a bottom wall and a pair of opposed side walls disposed on opposite sides of the rear wall and extending toward the conveyor means;
- a first bracket spaced from a second bracket extending outward from at least one of the side walls, each of the first brackets having a threaded opening thereing; and
- a screw member threadedly accommodated within the threaded openings within the first bracket, the outer ends of each screw member operationally abutting against the second bracket, the rotation of the screw member in the direction of increasing abutting force against the second bracket causing the outer end of the corresponding side wall to bend inwardly toward the opposite side wall, the rotation of the screw member in the direction of decreasing abutting force against the second bracket causing the corresponding side wall to resiliently move away from the opposite side wall.

References Cited

UNITED STATES PATENTS

| | | | |
|---|---|---|---|
| 2,311,577 | 2/1943 | Rose | 198—26 X |
| 2,586,172 | 2/1952 | Murphy | 214—7 |
| 2,599,937 | 6/1952 | Petrilli | 198—26 X |
| 2,679,313 | 5/1954 | Gueffroy et al. | 198—34 |
| 2,751,059 | 6/1956 | Klein et al. | 198—40 X |
| 2,799,414 | 7/1957 | Streckfuss | 198—24 X |
| 2,825,442 | 3/1958 | Carter | 198—165 X |
| 3,071,236 | 1/1963 | Hahn et al. | 198—34 X |
| 3,143,201 | 8/1964 | Wyle et al. | 198—49 X |
| 3,145,828 | 8/1964 | Hawley | 198—34 |
| 3,178,007 | 4/1965 | Standley et al. | 198—34 |
| 3,282,392 | 11/1966 | Fowler | 198—24 |
| 3,311,215 | 3/1967 | Clark et al. | 198—24 |

EVON C. BLUNK, *Primary Examiner.*

M. L. AJEMAN, *Assistant Examiner.*